Patented Dec. 28, 1943

2,337,882

UNITED STATES PATENT OFFICE 2,337,882

PROCESS FOR THE MANUFACTURE OF THIOUREA

Ferdinand J. Gajewski, Linden, N. J., assignor to General Aniline & Film Corporation, New York, N. Y., a corporation of Delaware No Drawing. Application June 4, 1940,
Serial No. 338,735

5 Claims. (Cl. 260—552)

This invention relates to the manufacture of thiourea and more particularly to the production thereof by the interaction of cyanamide with hydrogen sulfide in slightly ammoniacal solution.

Numerous methods have already been proposed for the manufacture of thiourea by the treatment of an alkaline earth metal salt of cyanamide, such as calcium cyanamide, in the presence or absence of water with hydrogen sulfide or an alkaline earth metal sulfide, as calcium or barium sulfide and an agent such as carbonic acid, phosphoric acid, sulfuric acid or the like which decompose to form hydrogen sulfide and an insoluble alkaline earth metal salt. The reaction has been conducted at elevated and at ordinary temperatures and with or without the application of pressure.

These procedures are less desirable than the present invention in several respects. The use of calcium and barium sulfides as a source of hydrogen sulfide not only increases the amount of alkaline earth metals which must later be removed, but in the case of barium sulfide the barium ion is introduced which is generally removed as barium sulfate. The difficulties encountered in the filtration of barium sulfate, particularly at lower temperatures, is common knowledge. Another disadvantage in such processes resides in the use of carbonic acid, sulfuric acid and phosphoric acid as precipitating reagents for the alkaline earth metal ions. These precipitations have been carried out under acidic conditions so that the alkaline earth metal salts formed possess appreciable solubilities.

For example, in 100 cc. of water, 0.241 gram of gypsum remain in solution at 0° C., 0.0316 gram of $CaHPO_4.2H_2O$ at 38° C. and 0.146 gram of calcium bicarbonate at 9° C. Although these amounts appear to be quite small, it must be remembered that in the large volumes of water used, these contaminations become appreciable in the final product.

It has also been proposed to prepare thiourea by the interaction of cyanamide and an excess of ammonium sulfide or ammonium polysulfide. In these processes the preparation of a solution of cyanamide is dependent upon a leaching of the calcium cyanamide from commercial calcium cyanamide. This operation in itself makes these proposals useless for manufacturing thiourea, for the solubility of calcium cyanamide is such as to necessitate the use of huge volumes of water in order to obtain complete extraction of the calcium cyanamide. A further disadvantage of this process is the fact that large quantities of sulfur are formed from the ammonium sulfide or polysulfide.

In summarizing the previous proposals for the manufacture of thiourea the main difficulties encountered were technical, such as in filtration and in the use of mills and other devices to bring all of the starting materials into the reaction, and chemical inasmuch as the solubility of the salts formed decreased the purity of the thiourea and also considerable amounts of by-products such as sulfur, dicyanamide, ammonium thiocyanate and others are formed. Furthermore, the prior processes are characterized by low yields and a lack of control over the various steps of the manufacturing procedures.

It is the object of the present invention to provide an improved method for manufacturing thiourea which will avoid all of the drawbacks of the prior processes mentioned above.

It is an object of this invention to prepare thiourea of a high degree of purity and in substantially theoretical yields from cyanamide by a much simplified procedure. These and other objects may be seen in the description that follows and in the claims appended hereunto.

I have found that thiourea can be made advantageously by following these steps. Commercial calcium cyanamide, containing variable amounts of calcium cyanamide is stirred in two to three times its total weight of water. While maintaining a temperature preferably below 20° C., carbon dioxide or sulfur dioxide is introduced under a slight or increased pressure. The gas may be introduced into the calcium cyanamide slurry in various ways. For example the gas may be introduced directly into the kettle in which the slurry is stirred or the slurry may be allowed to flow slowly through flues or packed towers which carry away the $CO_2$-containing gases generated in a coke oven or the $SO_2$-containing gases generated in a sulfur or pyrites burner. The carbon dioxide or sulfur dioxide used may be of a high degree of purity or it may be relatively impure. The source of the carbon dioxide could, for example, be coke oven flue gas, fermentation gas or any other. The sulfur dioxide can be obtained from the combustion of sulfur or any sulfide such as pyrites. In view of the suitability of sulfur dioxide and carbon dioxide it is clear that the presence of one as an impurity in the other will not interfere with the process as both will act jointly as precipitating agent. Any hydrogen sulfide contained in the gas can, of course, find use in the reaction.

The passage of carbon dioxide through the slurry is discontinued when a filtered sample no longer shows any turbidity upon the addition of a water-soluble carbonate such as ammonium carbonate, sodium carbonate or the like. The end point is also characterized by a sudden increase in carbon dioxide pressure.

The passage of sulfur dioxide is discontinued when a filtered sample gives no turbidity with ammonium hydroxide and a soluble carbonate such as ammodium carbonate. If ammonium hydroxide gives a precipitate, then too much sulfur dioxide is present. This excess may be take up by the addition of ammonium hydroxide to the mixture until a simple is alkaline, or more calcium cyanamide can be added until an alkaline reaction is obtained. A precipitate with a soluble carbonate indicates insufficient sulfur dioxide and more must be added. A clear solution with both reagents indicates the end point.

When the end point is reached, concentrated ammonium hydroxide is added to the reaction mixture in an amount much less than that which would be necessary to combine with the hydrogen sulfide. It is at this stage of the process that the ammonium hydroxide converts any small amounts of the acid calcium salt, i. e., calcium bicarbonate or calcium bisulfite to the highly insoluble neutral salt or calcium carbonate or calcium sulfite. The ammonium hydroxide functions in this connection according to the equation:

$$Ca(HCO_3)_2 + 2NH_4OH \longrightarrow CaCO_3 \downarrow + (NH_4)_2CO_3 + 2H_2O$$

or $$Ca(HSO_3)_2 + 2NH_4OH \longrightarrow CaSO_3 \downarrow + (NH_4)_2CO_3 + 2H_2O$$

The ammonium hydroxide functions also directly in the reaction presumably to form the ammonium salt of cyanamide in small amounts according to the equation:

$$H_2N-CN + 2NH_4OH \rightarrow [(NH_4)_2N-CN] + 2H_2O$$

the amount of ammonium hydroxide used is very much under that which would be necessary to convert all the cyanamide. The ammonium hydroxide is absolutely essential since the absorption of hydrogen sulfide is negligible without it.

After the ammonium hydroxide has been added, hydrogen sulfide is introduced under a slight or increased pressure and preferably below 20° C. The passage of hydrogen sulfide is stopped when a slight excess over that necessary to combine with the amidic nitrogen has been added. This point is marked by a rapid rise in the pressure due to the decrease in absorption. The temperature of the reaction mixture is raised to 70° C., and kept there for one hour. The reaction mixture is filtered hot and the filter cake is washed with hot water to leach out the remainder of the thiourea. If desired any part of the wash water can be returned to the reaction vessel in order to minimize dilution of the filtered thiourea solution. The latter is thereupon passed into a suitable evaporator and water is driven off until crystallization begins. The solution is thereupon cooled to crystallize the thiourea. The crystals are separated from the mother liquor in a filter or a centrifuge and the mother liquor is returned to the process. The yields of thiourea obtained are practically quantitative.

The following summary equations may be used to represent the reactions occurring in the process:

1. $$CaN-CN + H_2CO_3 \longrightarrow H_2N-CN + CaCO_3$$

or $$CaN-CN + H_2SO_3 \longrightarrow H_2N-CN + CaSO_3$$

2. $$H_2H-CN + 2NH_4OH \longrightarrow [(NH_4)_2N-CN] + 2H_2O$$

3. 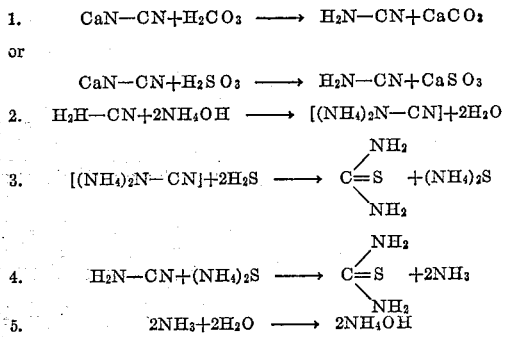

4. $$H_2N-CN + (NH_4)_2S \longrightarrow C(=S)(NH_2)(NH_2) + 2NH_3$$

5. $$2NH_3 + 2H_2O \longrightarrow 2NH_4OH$$

This is a repeating reaction. The product from reaction 5 is used again in reaction 2. The regeneration cycle repeats itself until all of the cyanamide is consumed. The reaction scheme is not limited solely to neutral salts of cyanamide and hydrogen sulfide as intermediates. The acid salts would behave in an analogous manner.

The following specific examples illustrate the present invention but the invention is not to be regarded as restricted thereto. The parts given are parts by weight.

*Example 1*

10.5 parts of commercial calcium cyanamide, containing 20% of amide nitrogen are stirred in an iron kettle with 31.5 parts of water. While stirring and maintaining a temperature below 20° C., carbon dioxide is introduced at about 0.5 atmosphere. The carbon dioxide is stopped after a filtered sample gives no precipitate with ammonium carbonate solution. To the mixture is added 2.8 parts of concentrated ammonium hydroxide, and hydrogen sulfide gas is introduced below 20° C. under slight or increased pressure until 2.7 to 2.8 parts have been absorbed. There is a rapid rise in pressure when the amount of hydrogen sulfide chemically equivalent to the amidic nitrogen has been added. The mixture is heated to 70° C. and kept there for 1 hour. After filtering hot, the remaining thiourea is leached out of the cake with hot water. The filtrates are evaporated until crystallization begins. After cooling the thiourea separates in excellent quality. Yield 5.625 parts.

*Example 2*

1.5 parts of commercial calcium cyanamide, containing 20% of amide nitrogen, is stirred in an iron kettle with 4.5 parts of water and cooled below 20° C. The temperature is maintained below 20° C., and sulfur dioxide gas is introduced at a pressure of approximately 0.5 atmosphere. The passage of gas is stopped after 1.0 part has been added. A filtered sample gives no precipitate with ammonium hydroxide, but gives one with ammonium carbonate, indicating that insufficient SO₂ has been added. The pH is approximately 9. To the reaction vessel is added .25 part of concentrated ammonium hydroxide. Then another 0.100 part of SO₂ are passed in. This quantity is sufficient to give a negative test with both ammonium hydroxide and ammonium carbonate. The pH of the solution is about 9. Then 0.25 part more of concentrated ammonium hydroxide (25%) are added, and then while stirring and maintaining a temperature below 20° C., 0.38 to 0.40 part of hydrogen sulfide are introduced at about 0.5 atmosphere. The absorption becomes very slow toward the end. The mixture is then heated to 70° C. and kept there for 1 hour. After filtering hot, the remaining thiourea is leached out of the cake with hot water. The filtrate is evaporated until crystallization begins. After cooling, the thiourea crystallizes. The quality is excellent and upwards of 0.65 part of thiourea are obtained.

I claim:

1. In a process for the preparation of thiourea the steps which comprise making an aqueous slurry of an alkaline earth metal cyanamide, introducing an agent selected from the group consisting of sulfur dioxide and carbon dioxide into the slurry until a filtered sample no longer shows turbidity upon treatment with ammonium hydroxide and a soluble carbonate when sulfur dioxide is introduced and upon treatment with a water-soluble carbonate when carbon dioxide is introduced, adding ammonium hydroxide to the reaction mixture in an amount slightly in excess of that required to convert any alkali metal bicarbonates to carbonates and any alkali metal bisulfites to sulfites, passing hydrogen sulfide through the reaction mixture until absorption ceases and heating the reaction mixture to about 70° C.

2. In a process for the preparation of thiourea the steps which comprise making an aqueous slurry of calcium cyanamide, introducing an agent selected from the group consisting of sulfur dioxide and carbon dioxide into the slurry until a filtered sample no longer shows turbidity upon treatment with ammonium hydroxide and a soluble carbonate when sulfur dioxide is introduced and upon treatment with a water-soluble carbonate when carbon dioxide is introduced, adding ammonium hydroxide to the reaction mixture in an amount slightly in excess of that required to convert any calcium bicarbonate to calcium carbonate and any calcium bisulfite to calcium sulfite, passing hydrogen sulfide through the reaction mixture until absorption ceases and heating the reaction mixture to about 70° C.

3. In a process for the preparation of thiourea the steps which comprise making an aqueous slurry of calcium cyanamide, introducing an agent selected from the group consisting of sulfur dioxide and carbon dioxide into the slurry until a filtered sample no longer shows turbidity upon treatment with ammonium hydroxide and a soluble carbonate when sulfur dioxide is introduced and upon treatment with a water-soluble carbonate when carbon dioxide is introduced, while maintaining the temperature of the reaction mixture below 20° C., adding ammonium hydroxide to the reaction mixture in an amount slightly in excess of that required to convert any calcium bicarbonate to calcium carbonate and any calcium bisulfite to calcium sulfite, passing hydrogen sulfide through the reaction mixture while maintaining the temperature of the reaction mixture below 20° C. until absorption ceases and heating the reaction mixture to approximately 70° C.

4. In a process for the preparation of thiourea the steps which comprise making an aqueous slurry of calcium cyanamide introducing carbon dioxide into the slurry until a filtered sample gives no precipitate when treated with ammonium hydroxide and a soluble carbonate while maintaining the temperature of the reaction mixture below 20° C., adding ammonium hydroxide to the reaction mixture, in an amount slightly in excess of that required to convert any calcium bicarbonate to calcium carbonate passing hydrogen sulfide through the reaction mixture while maintaining the temperature of the reaction mixture below 20° C. until absorption ceases, heating the reaction mixture to approximately 70° C. and maintaining it at that temperature for about an hour.

5. In a process for the preparation of thiourea the steps which comprise making an aqueous slurry of calcium cyanamide introducing sulfur dioxide into the slurry until a filtered sample gives no precipitate when treated with ammonium hydroxide and ammonium carbonate while maintaining the temperature of the reaction mixture below 20° C., adding ammonium hydroxide to the reaction mixture in an amount slightly in excess of that required to convert any calcium bisulfite to calcium sulfite, passing hydrogen sulfide through the reaction mixture while maintaining the temperature of the reaction mixture below 20° C. until absorption ceases, heating the reaction mixture to approximately 70° C. and maintaining it at that temperature for about an hour.

FERDINAND J. GAJEWSKI.